US008842629B2

(12) United States Patent
Qin et al.

(10) Patent No.: US 8,842,629 B2
(45) Date of Patent: Sep. 23, 2014

(54) SCHEDULING METHOD, DEVICE AND SYSTEM BASED ON QUALITY OF SERVICE

(75) Inventors: Fei Qin, Beijing (CN); Ming Ai, Beijing (CN); Jinbo Zhao, Beijing (CN); Hui Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/984,854

(22) PCT Filed: Feb. 13, 2012

(86) PCT No.: PCT/CN2012/071076
§ 371 (c)(1),
(2), (4) Date: Nov. 11, 2013

(87) PCT Pub. No.: WO2012/107004
PCT Pub. Date: Aug. 16, 2012

(65) Prior Publication Data
US 2014/0056245 A1    Feb. 27, 2014

(30) Foreign Application Priority Data

Feb. 12, 2011    (CN) .......................... 2011 1 0037138

(51) Int. Cl.
H04W 36/30    (2009.01)
H04W 72/04    (2009.01)
H04W 72/08    (2009.01)
H04W 36/00    (2009.01)

(52) U.S. Cl.
CPC ........ *H04W 72/087* (2013.01); *H04W 72/0413* (2013.01); *H04W 36/0088* (2013.01)
USPC ...................................................... 370/329

(58) Field of Classification Search
CPC ..... H04W 72/04; H04W 88/08; H04W 76/00; H04W 84/18; H04W 84/12

USPC .......................................... 370/329, 328, 310
See application file for complete search history.

(56) References Cited

U.S. PATENT DOCUMENTS

| 7,092,727 | B1 | 8/2006 | Li et al. | |
| 2007/0223491 | A1* | 9/2007 | Baek et al. | 370/395.21 |
| 2008/0274729 | A1* | 11/2008 | Kim et al. | 455/423 |

FOREIGN PATENT DOCUMENTS

| CN | 1756176 A | 4/2006 |
| CN | 101048982 A | 10/2007 |
| CN | 101060474 A | 10/2007 |
| CN | 101132631 A | 2/2008 |

OTHER PUBLICATIONS supplementary European search report for the counterpart EP application 1274462.8; dated on Dec. 2, 2014.*

(Continued)

*Primary Examiner* — Andrew Lai
*Assistant Examiner* — Zhiren Qin
(74) *Attorney, Agent, or Firm* — Kilpatrick Townsend & Stockton LLP

(57) ABSTRACT

Disclosed are a scheduling method, device and system based on quality of service. The method includes: for downlink service data, an access point (AP) or a gateway (GW) determines the quality of service (QoS) level of a downlink service packet of a media access control (MAC) layer according to the QoS attribute information of the downlink service packet of the IP layer, and then the AP transmits and schedules radio resources according to the QoS level; for uplink service data, user equipment (UE) determines the QoS level of an uplink service packet of the MAC layer according to the QoS attribute information of the uplink service packet of the IP layer, and reports the QoS level and the other QoS parameters to the AP in the manner of a scheduling request, and the AP completes the transmitting and scheduling of radio resources according to the QoS level, so that the UE transmits the uplink service data to the AP. Aimed at low-cost hot spot and indoor data service access, the present invention provides a novel network architecture and a perfect QoS service mechanism.

11 Claims, 4 Drawing Sheets

(56) References Cited

OTHER PUBLICATIONS

International Search Report for PCT/CN2012/071076.

Supplementary European Search Report for the counterpart EP application 12744462.8, Dec. 2, 2014.

* cited by examiner

US 8,842,629 B2

SCHEDULING METHOD, DEVICE AND SYSTEM BASED ON QUALITY OF SERVICE

This application is a US National Stage of International Application No. PCT/CN2012/071076, filed on 13 Feb. 2012, designating the United States, and claiming priority from Chinese Patent Application No. 201110037138.5, filed with the Chinese Patent Office on Feb. 12, 2011, and entitled "Scheduling method, device and system based on quality of service", which is herein incorporated by reference in its entirety.

FIELD OF THE INVENTION

The present invention relates to the field of network communications and particularly to a scheduling method, device and system based on quality of service.

BACKGROUND OF THE INVENTION

In recent years, there is a dramatically increasing demand for mobile data traffic along with the popularization of the mobile Internet and smart cellular phones, and indoor data services take a significant proportion thereof. Indoor and hotspot data services are characterized by typical immobility or very-low-speed mobility (nomadic mobility) of subscribers with a low mobility requirement; and on the other hand, the data services are generally Internet services based on Internet Protocol (IP) with a unified Quality of Service (QoS) requirement far below a QoS requirement of telecommunication-level services. Since a traditional cellular mobile communication system is generally designed for the high-speed mobile telecommunication-level services with seamless switching, it may be inefficient and costly when bearing the large-traffic low-speed IP data packet services. In view of this, cellular mobile network operators have to find out a low-cost high-capacity solution applicable to radio data access indoor and in a hotspot area. At present there are generally the following two solutions.

A first solution is a solution based on a Wireless Local Area Network (WLAN) in an unlicensed frequency band, for example, a method of branching a hotspot data service in a Wireless Fidelity (WiFi) system. In this solution, a WLAN system and a 3G system are generally coupled loosely to perform authentication and charging in a core network through the 3G system and to have radio network access through the WLAN.

The use of the foregoing architecture to cover the hotspot area can better branch the data service, but the use of the two different standard frameworks and systems results in poor experience of subscribers and the network can not provide the subscribers with a QoS guaranteed service due to the limitation of the WLAN radio access technology; and also link quality is susceptible to interference from other systems.

A second solution is a solution in which a demand for data service traffic indoor and in a hotspot area is met based on a femto cellular eNB (also referred to as a home eNB or Femto). This solution is characterized by a shorter coverage distance indoor and a smaller number of subscribers. Specifically the home eNB has transmission power comparable to a cellular phone terminal, typically below 23 dBm, and the number of subscribers typically ranges from 8 to 20. The home eNB has a lower cost and more flexibility of deployment than an indoor coverage system and a micro eNB, and functions to enhance data service experience of the subscribers indoor to some extent. However a drawback thereof lies in that the home eNB is not optimized for the low mobility or nomadic mobility characteristic of the data service indoor, and taking the Long Term Evolution (LTE) Femto system as an example, the LTE Femto system substantially adopts the entire protocol architecture and interface design of the LTE system with the support of a UE handover and is complex to implement despite reductions in capacity and power of the eNB and consequently still highly expensive. Moreover in the home eNB network, the majority of communication processing flows of UEs have to be controlled and managed by the $3^{rd}$ Generation Partnership Project (3GPP) core network, and data packets of the UEs for an access to the Internet and other external networks have to be forwarded by the 3GPP core network, thus bringing considerable signaling and data loads to the core network. This architecture also makes the home eNB network fail to be optimized in view of the characteristics that the subscribers indoor and in the hotspot area locally access to and visit the external networks.

In view of the issues of access and coverage indoor and in the hotspot area, the architecture of the LTE Femto system is complex and costly, and the communication process of the UEs may bring a considerable load impact on the 3GPP core network, but the WLAN technology fails to provide the UEs with telecommunication-level QoS guaranteed services despite its simple network deployment.

SUMMARY OF THE INVENTION

Embodiments of the invention provide a novel radio network access system and QoS mechanism of the radio network access system so as to adapt to the characteristics of existing indoor and hotspot data services.

An embodiment of the invention provides a first scheduling method based on Quality of Service, QoS, which includes:

determining, by an Access Point, AP, or a Gateway, GW, a QoS level of a downlink service data packet of a Media Access Control, MAC, layer according to QoS attribute information of an Internet Protocol, IP, layer in the received downlink service data packet; and scheduling, by the AP, radio resource transmission based upon the QoS level of the downlink service data packet of the MAC layer.

An embodiment of the invention provides a second scheduling method based on Quality of Service, QoS, which includes:

determining, by a User Equipment, UE, a QoS level of an uplink service data packet of a Media Access Control, MAC, layer according to QoS attribute information of an Internet Protocol, IP, layer of the uplink service data packet, and reporting a scheduling request carrying the QoS level to an Access Point, AP; and transmitting, by the UE, the uplink service data packet processed by a physical layer of the UE to the AP by using resources scheduled by the AP according to the scheduling request.

An embodiment of the invention provides a third scheduling method based on Quality of Service. QoS, which includes:

receiving, by an Access Point, AP, at a Media Access Control, MAC, layer, a scheduling request reported by a User equipment, UE; and scheduling, by the AP, radio resources according to a QoS level of an uplink service data packet of the MAC layer in the scheduling request.

An embodiment of the invention provides a first Access Point, AP, device, which includes:

an Internet Protocol, IP, layer configured to determine a Quality of Service, QoS, level of a downlink service data packet of a Media Access Control, MAC, layer according to QoS attribute information of the IP layer in the received downlink service data packet; and the Media Access Control, MAC, layer configured to schedule radio resource transmission based upon the QoS level of the downlink service data packet of the MAC layer.

An embodiment of the invention provides a second Access Point, AP, device, which includes:

a Media Access Control, MAC, layer configured to receive a downlink service data packet of the MAC layer, sent from a gateway, GW, carrying a Quality of Service, QoS, level and to schedule radio resource transmission based upon the QoS level of the downlink service data packet of the MAC layer.

An embodiment of the invention provides a gateway, GW, which includes:

an Internet Protocol, IP, layer configured to determine a Quality of Service, QoS, level of a downlink service data packet of a Media Access Control, MAC, layer according to QoS attribute information of the IP layer in the received downlink service data packet and to send the downlink service data packet of the MAC layer carrying the QoS level to an Access Point, AP.

An embodiment of the invention provides a User Equipment, UE, which includes:

an Internet Protocol, IP, layer configured to determine a Quality of Service, QoS, level of an uplink service data packet of a Media Access Control, MAC, layer according to QoS attribute information of the IP layer of the uplink service data packet;

the Media Access Control, MAC, layer configured to report a scheduling request carrying the QoS level to an Access Point, AP; and a physical layer configured to transmit the uplink service data packet processed by the physical layer of the UE to the AP by using resources scheduled by the AP according to the scheduling request.

In correspondence to the foregoing user equipment, an embodiment of the invention further provides a third access point device, which includes:

a Media Access Control, MAC, layer configured to receive a scheduling request reported by a User equipment, UE, and to schedule radio resources according to a Quality of Service, QoS, level of an uplink service data packet of the MAC layer in the scheduling request.

An embodiment of the invention provides a first radio network access system including at least one Access Point, AP, at least one User Equipment, UE, and a gateway, GW, wherein:

the GW is configured to determine, at an Internet Protocol, IP, layer of the GW, a Quality of Service, QoS, level of a downlink service data packet of a Media Access Control, MAC, layer according to QoS attribute information of the IP layer in the downlink service data packet; and the AP device is configured to receive the downlink service data packet of the MAC layer, sent from the GW, carrying the QoS level and to schedule radio resource transmission based upon the QoS level of the downlink service data packet of the MAC layer.

An embodiment of the invention provides a second radio network access system including at least one Access Point, AP, at least one User Equipment, UE, and a gateway, GW, wherein:

the UE is configured to determine a Quality of Service, QoS, level of an uplink service data packet of a Media Access Control, MAC, layer according to QoS attribute information of an Internet Protocol, IP, layer of the uplink service data packet and to report a scheduling request carrying the QoS level to the AP; and the AP is configured to receive the scheduling request reported by the UE and to schedule radio resources according to the QoS level of the uplink service data packet of the MAC layer in the scheduling request.

The embodiments of the invention have the following advantageous effects:

The embodiments of the invention provide a novel radio access network and also provide a novel QoS mechanism adapted to the novel radio access network in view of the existing issues of indoor and hotspot area coverage. In the novel QoS mechanism according to the embodiments of the invention, for downlink service data, an AP or a GW determines a QoS level of a downlink service data packet of an MAC layer according to QoS attribute information of the downlink service data packet at an IP layer, and then the AP schedules radio resource transmission according to the QoS level; and for uplink service data, a UE determines a QoS level of an uplink service data packet of the MAC layer according to QoS attribute information of the uplink service data packet at the IP layer and reports the QoS level and other QoS parameters to the AP in the manner of a scheduling request, and the AP schedules radio resource transmission according to the QoS level, so that the UE transmits the uplink service data packet to the AR The embodiments of the invention can implement a perfect QoS control mechanism in the foregoing novel radio access network, and this mechanism can be implemented simply at a lower cost as compared with the QoS control mechanism of the LTE because no participation of a core network device and a PCC related protocol entity is required.

Moreover the novel radio access network according to the embodiments of the invention can be implemented simply with existing LTE underlying communication technologies in view of the characteristics of existing indoor and hotspot data services, to thereby provide a LIE with a telecommunication-level QoS-guaranteed service, and QoS related operations will not need participation of a core network node, to thereby greatly alleviate signaling load of the core network and avoid the problems of failing to provide a UE with a QoS-guaranteed service in the existing solution based on the wireless local area network (WLAN) in an unlicensed frequency band and of high implementation complexity and heavy signaling load of the core network in the existing solution based on the home eNB.

DETAILED DESCRIPTION OF THE EMBODIMENTS

Particular implementations of a novel radio network access system and QoS mechanism of the radio access system according to embodiments of the invention will be described below in details with reference to the drawings.

Particularly, embodiments of the invention provide a Long Term Evolution Local Area Network (LTE-LAN) implemented based on underlying communication technologies of the LTE mobile communication system in order to achieve effective coverage of home and enterprise environments and a hotspot area and to provide a large-amount-of-data communication approach for a user equipment with nomadic mobility characteristic, and a LTE-LAN architecture according to the embodiments of the invention will be described below briefly.

Figure 3:
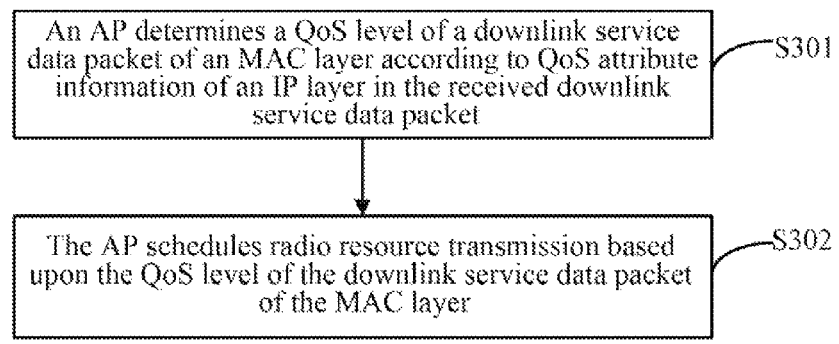
FIG. 3 is a first flow chart of a scheduling method based on QoS according to an embodiment of the invention.

As illustrated in FIG. 3, the LTE-LAN includes at least one Long Term Evolution Local Area Network User Equipment (LTE-LAN UE, simply UE below), at least one Long Term Evolution Local Area Network Access Point (LTE-LAN Access Point, simply AP below) and a Long Term Evolution Local Area Network Gateway (LTE-LAN Gateway, simply GW below), wherein:

The AP provides the UE with LTE-LAN coverage based on LTE null interface technologies and is connected with a core network device (e.g., an Authentication, Authorization and Accounting Server (AAA server), a Home Subscriber Server (HSS), a charging server, etc.) through the gateway device GW, and different APs access to an external network through the gateway device GW after being synchronized.

The UE is configured to access to the external network and communicate with UEs in the LTE-LAN through a channel established with the AP and the GW.

The GW is configured to interact with the AP, the core network device and the external network to enable the UE to access to the external network and communicate with the UEs in the LTE-LAN, particularly including the following functions:

1. An interface management function to establish and manage an Iu-r interface via which the GW and the AP are connected;

2. A context management function to manage, based on the Iu-r interface, a context establishment procedure, a context modification procedure, a context release procedure and guaranteed QoS of the UE between the GW and the AP;

3. Authentication and verification functions to perform bidirectional authentication and verification between the AP and the GW upon startup of the AP;

4. A synchronization information interaction function to perform interactions of synchronization parameter information between APs based on the Iu-r interface to enable the AP connected with the GW to select a synchronization source according to obtained synchronization parameter information;

5. An interference management function to forward an interference indication message sent from a source AP subjected to interference to a target AP generating the interference based on the Iu-r interface to enable the target AP to adjust operating parameters according to the received interference indication message;

6. An assistance charging function to send a charging start notification to the core network device after determining successful establishment of a connection of the AP to the UE, to perform charging in an indicated charging mode according to a charging response message returned from the core network device, and to report charging information to the core network device to enable the core network device to finish charging; and 7. A configuration management function to configure operating parameters of the AP connected with the GW, to define legal use locations of different APs, and/or to perform a user management procedure based on a demand of an administrator.

In the above LTE-LAN according to the embodiments of the invention, the use of the flatten network architecture can make an access of a UE to the external network and another UE in the LTE-LAN to be performed simply at a low cost, and the QoS mechanism of the LTE system itself will not be applicable any longer to the QoS of this novel radio network access system of the LTE-LAN. On one hand, this is because in the QoS architecture of the LTE system, the QoS process requires participation of the core network device and also has to be guaranteed by a Policy and Charging Control (PCC) related protocol entity, while the LTE-LAN according to the embodiments of the invention adopts the flatten network architecture in which neither a core network device nor a PCC related protocol entity is present; and on the other hand, this is because this novel radio network access system primarily intended for indoor and hotspot data services has a lower QoS requirement than the LTE system, and the original QoS mechanism of the LTE system will not be applicable any longer. Thus the embodiments of the invention provide a novel QoS mechanism adapted to this novel radio network access system, and a particular implementation of this novel QoS mechanism will be described below in details.

The QoS mechanism of the LTE-LAN according to the embodiments of the invention is implemented particularly through the following scheduling methods based on QoS and architectures of access point devices, user equipments and radio network access systems.

Firstly, the scheduling methods based on QoS according to embodiments of the invention will be described below in details.

Figure 2:
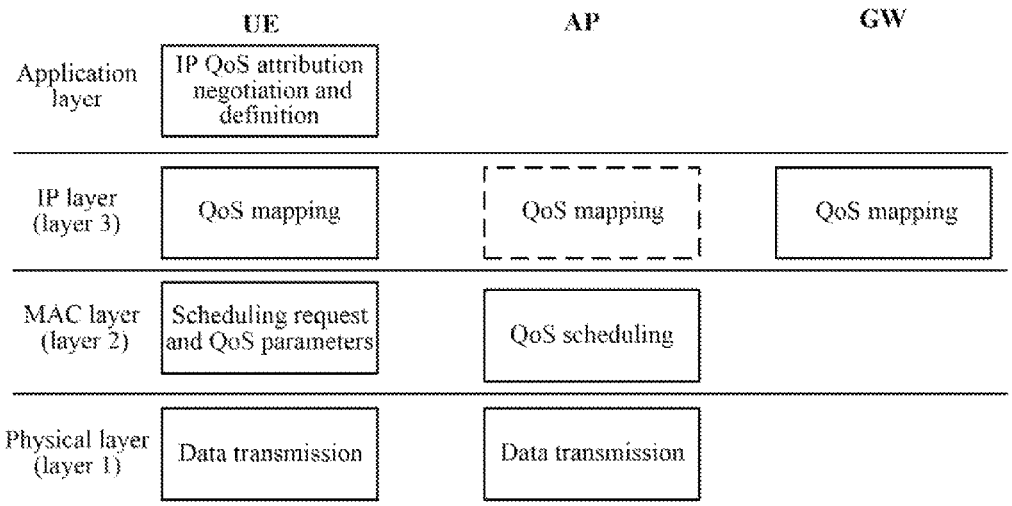
FIG. 2 is a schematic diagram of QoS control layers in an LTE-LAN system according to an embodiment of the invention.

Before the scheduling methods based on QoS according to the embodiments of the invention is described, QoS control layers of the LTE-LAN system according to the embodiments of the invention will be introduced briefly, and as illustrated in FIG. 2, the QoS control layers includes three entities which are a UE, an AP and a GW, wherein:

The UE includes an application layer, an IP layer, a Media Access Control (MAC) layer and a physical layer, wherein the application layer has functions to negotiate about and define IP QoS attribution information, the IP layer has a function to map QoS, the MAC layer has a function to generate a scheduling request to provide the AP with QoS parameters, and the physical layer has functions to further process and transmit data of the MAC layer.

The AP includes the MAC layer and the physical layer, and optionally includes the IP layer (represented with a dotted line in FIG. 2), wherein the MAC layer has a function to schedule QoS, the physical layer has the functions to further process and transmit data of the MAC layer, and the optional IP layer has the function to map QoS.

The GW includes the IP layer, and the GW includes the corresponding function of the IP layer only if the AP does not has the corresponding function of the IP layer, and the IP layer of the GW also has the function to map QoS.

In the scheduling methods based on QoS according to the embodiments of the invention, both QoS control in the process of scheduling and transmitting a downlink service data packet and QoS control in the process of scheduling and transmitting an uplink service data packet are included. These two aspects be described below respectively in connection with the foregoing QoS control layers.

Scheduling and transmission of a downlink service data packet further particularly includes two implementations, where in a first implementation, user downlink service data exits at the AP side (that is, the AP in the LTE-LAN has a routing function), and in a second implementation, user downlink service data exits at the GW side (that is, the AP in the LTE-LAN has no routing function).

In the first implementation, the scheduling method based on QoS, as illustrated in FIG. 3, particularly includes the following steps:

S301. An AP determines a QoS level of a downlink service data packet of an MAC layer according to QoS attribute information of an IP layer in the received downlink service data packet; and S302. The AP schedules radio resource transmission based upon the QoS level of the downlink service data packet of the MAC layer.

In the foregoing step S301, the AP determines, at the IP layer, the QoS level of the downlink service data packet of the MAC layer according to the QoS attribute information in the received downlink service data packet and a preset mapping relationship between QoS attribute information and QoS levels, and configures the determined QoS level in the downlink service data packet of the MAC layer; and In the foregoing step S302, the AP schedules, at the MAC layer, resources for a UE receiving the downlink service data packet in a preset scheduling strategy according to the QoS level of the downlink service data packet; and then transmits the downlink service data packet processed by the physical layer of the AP to the UE.

Before the foregoing step S301, a radio link is established between the UE and the AP, and the radio link will be established together with a Data Radio Bearer (DRB) and a Signaling Radio Bearer (SRB) without configuring any QoS parameter of the corresponding bearers.

After the UE initiates a service, the AP will receive downlink service data packets (IP data packets) transmitted to the UE, where these downlink service data packets may be returned from another UE or a server, in the LTE-LAN network, accessed by the UE. Since QoS attribute information of uplink IP links and downlink IP links of respective services is preconfigured at the application layers of the UE and the other UE or the server accessed by the UE, a corresponding QoS attribute information field will be carried in an IP header of each downlink service data packet.

The QoS attribute information field is represented by different combinations of values of D (bit 3), T (bit 4) and R (bit 5) bits in the type of service field in the IP header; and as depicted in Table 1 below, when D takes the value of 0, T takes the value of 0 and R takes the value of 1, they characterize QoS attribute information of control signaling in a GW in the LTE-LAN system. QoS attribute information of different types of services is represented by different combinations of values of D, T and R.

In the AP, a mapping relationship between QoS attribute information and QoS levels is preconfigured as depicted in Table 1 below:

TABLE 1

| Values of bits 3/4/5 in IP header | | | | |
|---|---|---|---|---|
| 3, D | 4, T | 5, R | QoS Index | Type of service |
| 0 | 0 | 1 | 0 | Control signaling in one GW in LTE-LAN system; |
| 1 | 0 | 1 | 1 | Control signaling between GWs in LTE-LAN system; |
| 1 | 1 | 0 | 2 | Stream, e.g., VoIP voice-level 1 |

TABLE 1-continued

| Values of bits 3/4/5 in IP header | | | | |
|---|---|---|---|---|
| 3, D | 4, T | 5, R | QoS Index | Type of service |
| 1 | 1 | 0 | 3 | Video |
| 1 | 0 | 0 | 4 | Stream, e.g., voice-level 2 |
| 0 | 0 | 1 | 5 | Background - High |
| 0 | 0 | 1 | 6 | Best-effort transmission service |
| 0 | 0 | 0 | 7 | Background - Low |

In Table 1 above, the QoS index represents a specific value of the QoS level, including 8 levels ranging from 0 to 7 (from high to low) in the foregoing example. Different QoS attribute information corresponds to different types of service data packets, and some service data packets, e.g., control signaling, voice and other data packets, have higher QoS levels. Of course, Table 1 above is merely a particular example, and the embodiment of the invention will not limit how to divide QoS levels and to set the mapping relationship between QoS levels and QoS attribute information.

In the foregoing step S302, the AP schedules, at the MAC layer, resources for the UE receiving the downlink service data packet in the preset scheduling strategy according to the QoS level of the downlink service data packet, and particularly the AP can schedule resources for the UE receiving the downlink service data packet in a variety of different scheduling strategies, and embodiments of the invention provide two particular scheduling strategies as follows:

1. The AP performs the following steps for each QoS level in a descending order of QoS levels:

The AP selects respective downlink service data packets at the current QoS level from its downlink buffer and determines respective UEs receiving the selected downlink service data packets; and The AP schedules resources for the respective determined UEs in accordance with predefined resource allocation priority and maximum null interface transmission delay requirements corresponding to the current QoS level according to channel quality feedback information of the respective UEs receiving the downlink service data packets.

The above-mentioned resource allocation priority refers to a priority order for scheduling data packets, and the above-mentioned maximum null interface transmission delay refers to maximum delay time when transmitting data packets via a null interface, for example, it can be defined that 99% of data shall be scheduled and transmitted within the delay time.

In the embodiment of the invention, a predefined correspondence relationship among QoS levels, resource allocation priority and maximum null interface transmission delays is as depicted in Table 2 below:

TABLE 2

| | | Null interface QoS demands | |
|---|---|---|---|
| QoS level | Type of service | Resource allocation priority | Null interface transmission delay requirement |
| 0 | Control signaling in one GW in LTE-LAN system; | 0 (highest) | 100 ms |
| 1 | Control signaling between GWs in LTE-LAN system; | 1 | 100 ms |
| 2 | Stream, e.g., VoIP voice-level 1 | 2 | 50 ms |
| 3 | Video | 3 | 100 ms |

TABLE 2-continued

| | | Null interface QoS demands | |
|---|---|---|---|
| QoS level | Type of service | Resource allocation priority | Null interface transmission delay requirement |
| 4 | Stream, e.g., voice-level 2 | 4 | 100 ms |
| 5 | Background - High | 5 | 50 ms |
| 6 | Best-effort transmission service | 6 | 200 ms |
| 7 | Background - Low | 7 (lowest) | 500 ms |

2. The AP performs the following steps for each QoS level in a descending order of QoS levels of downlink service data packets:

The AP selects respective downlink service data packets at the current QoS level from its downlink buffer and determines respective UEs receiving the selected downlink service data packets; and The AP schedules resources for the respective determined UEs in accordance with predefined resource allocation priority and maximum null interface transmission delay requirements corresponding to the current QoS level of the downlink service data packet sequentially according to channel quality feedback information of the UEs in a descending order of the numbers of downlink service data packets at the current QoS level received by the respective UEs.

In this scheduling strategy 2, since the downlink buffer of the AP may store therein a plurality of downlink service data packets for a plurality of UEs, a sequential order for scheduling resources for respective UEs is further decided by the numbers of downlink service data packets to be received by the respective UEs in the process of scheduling data packets at the same level, e.g., the level 0, and assumed at this level, a UE 1 has the largest number of downlink service data packets, the AP will schedule resources preferentially for the UE 1 and then for a UE with the second largest number of downlink service data packets until resources are scheduled for all the UEs at this level, and then proceeds to scheduling at a next level.

Of course, other strategies can be also adopted in a particular implementation, for example, a strategy of scheduling only according to channel quality feedback information of respective UEs or a strategy of scheduling only according to the number of downlink service data packets of the UE, and the embodiment of the invention will not be limited to any particular scheduling strategy.

Figure 4:
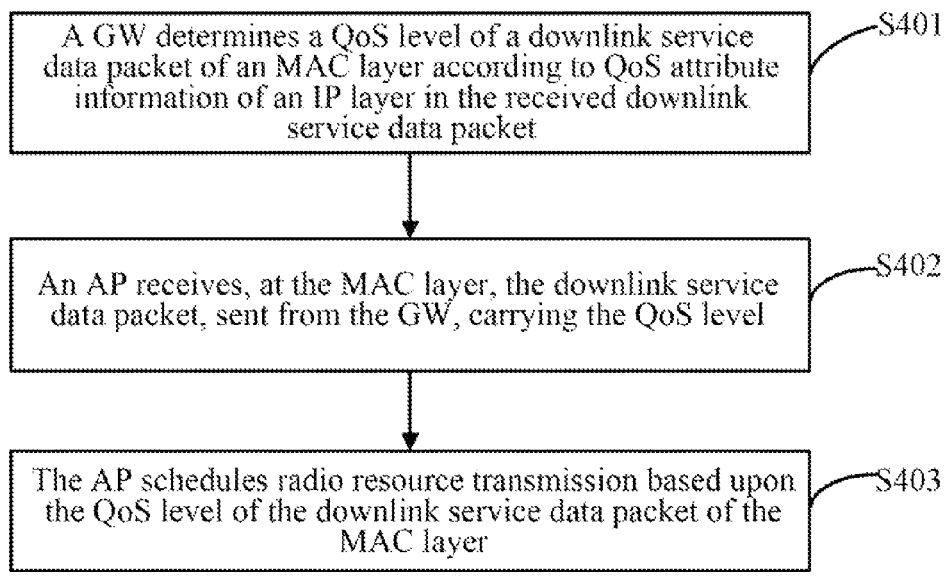
FIG. 4 is a second flow chart of a scheduling method based on QoS according to an embodiment of the invention.

For the second implementation of QoS control in scheduling and transmission of a downlink service data packet, in particular, the scheduling method based on QoS, as illustrated in FIG. 4, particularly includes the following steps:

S401. A GW determines a QoS level of a downlink service data packet of an MAC layer according to QoS attribute information of an IP layer in the received downlink service data packet.

Particularly in this step S401, the GW determines, at its IP layer, the QoS level of the downlink service data packet of the MAC layer according to the QoS attribute information in an IP header of the downlink service data packet and a preset mapping relationship between QoS attribute information and QoS levels, and configures the determined QoS level in the downlink service data packet.

S402. An AP receives, at the MAC layer, the downlink service data packet, sent from the GW, carrying the QoS level.

S403. The AP schedules radio resource transmission based upon the QoS level of the downlink service data packet of the MAC layer.

In the above step S403, the AP configures the determined QoS level in the downlink service data packet and schedules resources for a UE receiving the downlink service data packet in a preset scheduling strategy according to the QoS level of the downlink service data packet, and then transmits the downlink service data packet processed by a physical layer of the AP to the UE.

A particular implementation of the step S401 is similar o the step S301 performed by the AP in the first implementation, so a detailed description thereof will be omitted here.

A particular implementation of the step S403 is also similar to the step S302 performed by the AP in the first implementation, so a detailed description thereof will be omitted here.

Figure 5:
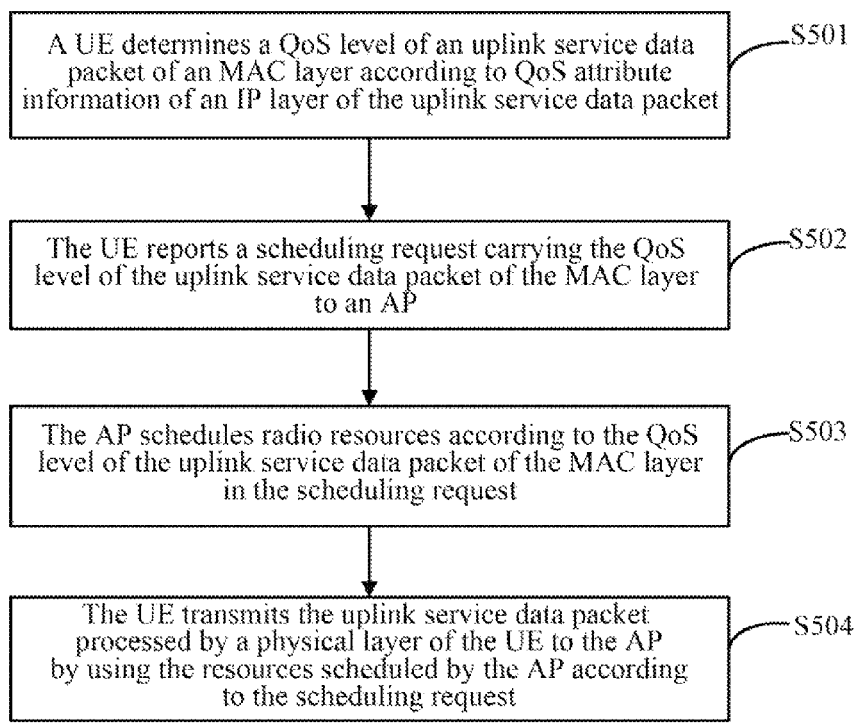
FIG. 5 is a third flow chart of a scheduling method based on QoS according to an embodiment of the invention.

For QoS control in the process of scheduling and transmitting an uplink service data packet, a scheduling method based on QoS according to an embodiment of the invention, as illustrated in FIG. 5, includes the following steps:

S501. A UE determines a QoS level of an uplink service data packet of an MAC layer according to QoS attribute information of an IP layer of the uplink service data packet;

S502. The UT reports a scheduling request carrying the QoS level of the uplink service data packet of the MAC layer to an AP;

S503. The AP schedules radio resources according to the QoS level of the uplink service data packet of the MAC layer in the scheduling request; and S504. The UE transmits the uplink service data packet processed by a physical layer of the UE to the AP by using the resources scheduled by the AP according to the scheduling request.

Before the foregoing step S501, the UE need set, at its application layer, QoS attribute information corresponding to a service to which the initiated uplink service data packet belongs in an IP header of the uplink service data packet according to pre-configured QoS attribute information of uplink IP links of respective services;

In the foregoing step S501, the UE determines, at its IP layer, the QoS level of the uplink service data packet of the MAC layer according to the QoS attribute information of the IP layer in the uplink service data packet and a preset mapping relationship between QoS attribute information and QoS levels; and fur a particular implementation thereof, reference is made to the QoS control mechanism of transmitting a downlink service data packet, and a detailed description thereof will be omitted here.

In the foregoing step S502, the scheduling request generated by the UE can early therein the total number of uplink service data packets to be transmitted in its uplink buffer, QoS levels of respective uplink service data packets and ratios of the numbers of uplink service data packets at respective QoS levels to the total number.

Assumed there are 2 QoS levels (levels 0 and 1) in the uplink buffer, the scheduling request includes therein the total number of uplink service data packets to be scheduled in the uplink buffer, the highest QoS level of the uplink service data packets, i.e., the level 0, and the ratio of the number of uplink service data packets at the level 0 to the total number of uplink service data packets to be scheduled, e.g., 25%; and further includes the second highest QoS level of the uplink service data packets, i.e., the level 1, and the ratio of the number of uplink service data packets at this level to the total number of uplink service data packets to be scheduled, e.g., 75%.

In the foregoing step S503, the AP schedules, at its MAC layer, resources for the UE sending the uplink service data packet in a preset scheduling strategy according to the QoS level of the uplink service data packet of the MAC layer carried in the scheduling request, particularly possibly in the following process:

Since the AP may receive scheduling requests reported from more than one UE, the AP can schedule resources required for respective UEs in the following strategy:

The AP performs the following steps at each QoS level in a descending order of respective QoS levels of uplink service data packets in the scheduling request:

The AP calculates the numbers of uplink service data packets of the respective UEs at the same QoS level according to the total numbers of uplink service data packets in the scheduling requests reported from the respective UEs and ratios of the numbers of uplink service data packets at the respective QoS levels to the total numbers; and The AP schedules resources sequentially for the uplink service data packets of the respective UEs in accordance with predefined resource allocation priority and maximum null interface transmission delay requirements corresponding to the current QoS level according to channel quality feedback information of the UEs in a descending order of the numbers of uplink service data packets of the respective UEs at this QoS level.

Based upon the same inventive idea, embodiments of the invention further provide an Access Point, AP, device, a User Equipment, UE, a gateway, GW, and a radio network access system, and since the access point device, the user equipment, the gateway and the radio network access system solve the problem in a similar principle to the foregoing scheduling method based on QoS, reference can be made to the implementations of the foregoing method for implementations of these devices, so a repeated description thereof will be omitted here.

For the first implementation of QoS control in the process of transmitting downlink service data, an access point device according to an embodiment of the invention particularly includes:

An IP layer configured to determine a QoS level of a downlink service data packet of a Media Access Control, MAC, layer according to QoS attribute information of the IP layer in the received downlink service data packet; and The Media Access Control, MAC, layer configured to schedule radio resource transmission based upon the QoS level of the downlink service data packet of the MAC layer.

Furthermore, for the first implementation of QoS control in the process of transmitting downlink service data, the access point device further includes a physical layer.

Correspondingly, the IP layer is further configured to determine the QoS level of the downlink service data packet of the MAC layer according to the QoS attribute information in an IP header of the received downlink service data packet and a preset mapping relationship between QoS attribute information and QoS levels and to configure the determined QoS level in the downlink service data packet;

Correspondingly, the MAC layer is further configured to schedule resources for a UE receiving the downlink service data packet in a preset scheduling strategy according to the QoS level of the downlink service data packet of the MAC layer; and The physical layer is configured to process the downlink service data packet transmitted from the MAC layer and to transmit the downlink service data packet processed to the UE.

Furthermore, the MAC layer of the access point device is further configured to select respective downlink service data packets at the current QoS level from a downlink buffer of the AP device in a descending order of QoS levels and to determine respective UEs receiving the selected downlink service data packets; and to schedule resources for the respective determined UEs in accordance with predefined resource allocation priority and maximum null interface transmission delay requirements corresponding to the current QoS level according to channel quality feedback information of the respective UEs receiving the downlink service data packets.

Furthermore, the MAC layer of the access point device is further configured to select respective downlink service data packets at the current QoS level from a downlink buffer of the AP device in a descending order of QoS levels of downlink service data packets and to determine respective UEs receiving the selected downlink service data packets; and to schedule resources fir the respective determined UEs in accordance with predefined resource allocation priority and maximum null interface transmission delay requirements corresponding to the current QoS level of the downlink service data packet sequentially according to channel quality feedback information of the UEs in a descending order of the numbers of downlink service data packets at the current QoS level received by the respective UEs.

For the second implementation of QoS control in the process of transmitting downlink service data, an access point device according to an embodiment of the invention particularly includes:

A Media Access Control, MAC, layer configured to receive a downlink service data packet of the MAC layer, sent from a gateway; GW, carrying a QoS level and to schedule radio resource transmission based upon the QoS level of the downlink service data packet of the MAC layer.

Furthermore, for the second implementation of QoS control in the process of transmitting downlink service data, the access point device further includes a physical layer.

Correspondingly, the MAC layer is further configured to configure the determined QoS level in the downlink service data packet and to schedule resources for a UE receiving the downlink service data packet in a preset scheduling strategy according to the QoS level; and The physical layer is configured to process the downlink service data packet transmitted from the MAC layer and to transmit the downlink service data packet processed to the UE.

Furthermore, for the second implementation of QoS control in the process of transmitting downlink service data, the MAC layer of the AP can be further configured to select respective downlink service data packets at the current QoS level from a downlink buffer of the AP in a descending order of QoS levels of downlink service data packets and to determine respective UEs receiving the selected downlink service data packets; and to schedule resources for the respective determined UEs in accordance with predefined resource allocation priority and maximum null interface transmission delay requirements corresponding to the current QoS level of the downlink service data packet sequentially according to channel quality feedback information of the UEs in a descending order of the numbers of downlink service data packets at the current QoS level received by the respective UEs.

Furthermore, for the second implementation of QoS control in the process of transmitting downlink service data, the MAC layer of the AP can be further configured to select respective downlink service data packets at the current QoS level from a downlink buffer of the AP in a descending order of QoS levels of downlink service data packets and to determine respective UEs receiving the selected downlink service data packets; and to schedule resources for the respective determined UEs in accordance with predefined resource allocation priority and maximum null interface transmission delay requirements corresponding to the current QoS level of the downlink service data packet sequentially according to channel quality feedback information of the UEs in a descending order of the numbers of downlink service data packets at the current QoS level received by the respective UEs.

For the second implementation of QoS control in the process of transmitting downlink service data, an embodiment of the invention further provides a gateway, GW, particularly including: an IP layer configured to determine a QoS level of a downlink service data packet of a Media Access Control, MAC, layer according to QoS attribute information of the IP layer in the received downlink service data packet, to configure the determined QoS level in the downlink service data packet of the MAC layer, and to send the downlink service data packet of the MAC layer to an AP.

For QoS control in the process of transmitting uplink service data, an embodiment of the invention provides a User Equipment, UE, particularly including:

An IP layer configured to determines a QoS level of an uplink service data packet of a Media Access Control, MAC, layer according to QoS attribute information of the IP layer of the uplink service data packet;

The Media Access Control, MAC, layer configured to report a scheduling request carrying the QoS level to an Access Point, AP; and A physical layer configured to transmit the uplink service data packet processed by the physical layer of the UE to the AP by using resources scheduled by the AP according to the scheduling request.

Furthermore, for QoS control in the process of transmitting uplink service data, the user equipment according to the embodiment of the invention further includes an application layer configured to set QoS attribute information corresponding to a service to which the initiated uplink service data packet belongs in an IP header of the uplink service data packet according to pre-configured QoS attribute information of uplink IP links of respective services; and Correspondingly, the IP layer is further configured to determine the QoS level of the uplink service data packet of the MAC layer according to the QoS attribute information of the uplink service data packet and a preset mapping relationship between QoS attribute information and QoS levels, and to configure the determined QoS level in the uplink service data packet of the MAC layer.

Furthermore, for QoS control in the process of transmitting uplink service data, the MAC layer of the UE according to the embodiment of the invention is particularly configured to determine respectively the total number of uplink service data packets to be transmitted, QoS levels of respective uplink service data packets and ratios of the numbers of uplink service data packets at respective QoS levels to the total number; and to generate the scheduling request by carrying the determined total number of uplink service data packets to be transmitted, QoS levels of respective uplink service data packets and ratios of the numbers of uplink service data packets at respective QoS levels to the total number in the scheduling request.

Furthermore, for QoS control in the process of transmitting uplink service data, correspondingly, an embodiment of the invention further provides an AP device corresponding thereto, and the AP device particularly includes:

An MAC layer configured to receive a scheduling request reported by a User equipment, UE, and to schedule radio resources according to a QoS level of an uplink service data packet of the MAC layer in the scheduling request.

Furthermore, for QoS control in the process of transmitting uplink service data, the AP device further includes a physical layer;

Correspondingly, the MAC layer in the AP device is particularly configured to schedule resources for the UE sending the uplink service data packet in a preset scheduling strategy according to the QoS level of the uplink service data packet carried in the scheduling request; and The physical layer in the AP device is configured to receive the uplink service data packet transmitted by the user equipment using the resources.

For QoS control in the process of transmitting uplink service data, the MAC layer of the above AP is further configured to calculate the numbers of uplink service data packets of respective UEs at the same QoS level according to the total numbers of uplink service data packets and ratios of the numbers of uplink service data packets at respective QoS levels to the total numbers in scheduling requests reported by the respective UEs; and to schedule resources sequentially for the respective UEs in accordance with predefined resource allocation priority and maximum null interface transmission delay requirements corresponding to each QoS level according to channel quality feedback information of the UEs in a descending order of the numbers of uplink service data packets of the respective UEs at the current QoS levels in a descending order of QoS levels of uplink service data packets.

For the second implementation of QoS control in the process of transmitting downlink service data, an embodiment of the invention provides a radio network access system, which, as illustrated in FIG. 2, includes at least one Access Point, AP, at least one User Equipment, UE, and a gateway, GW, wherein:

The gateway, GW, is configured to determine, at an IP layer of the GW, a QoS level of a downlink service data packet of a Media Access Control, MAC, layer according to QoS attribute information of the IP layer in the downlink service data packet; and The Access Point, AP, device is configured to receive the downlink service data packet of the MAC layer, sent from the GW, carrying the QoS level and to schedule radio resource transmission based upon the QoS level of the downlink service data packet of the MAC layer.

Figure 1:
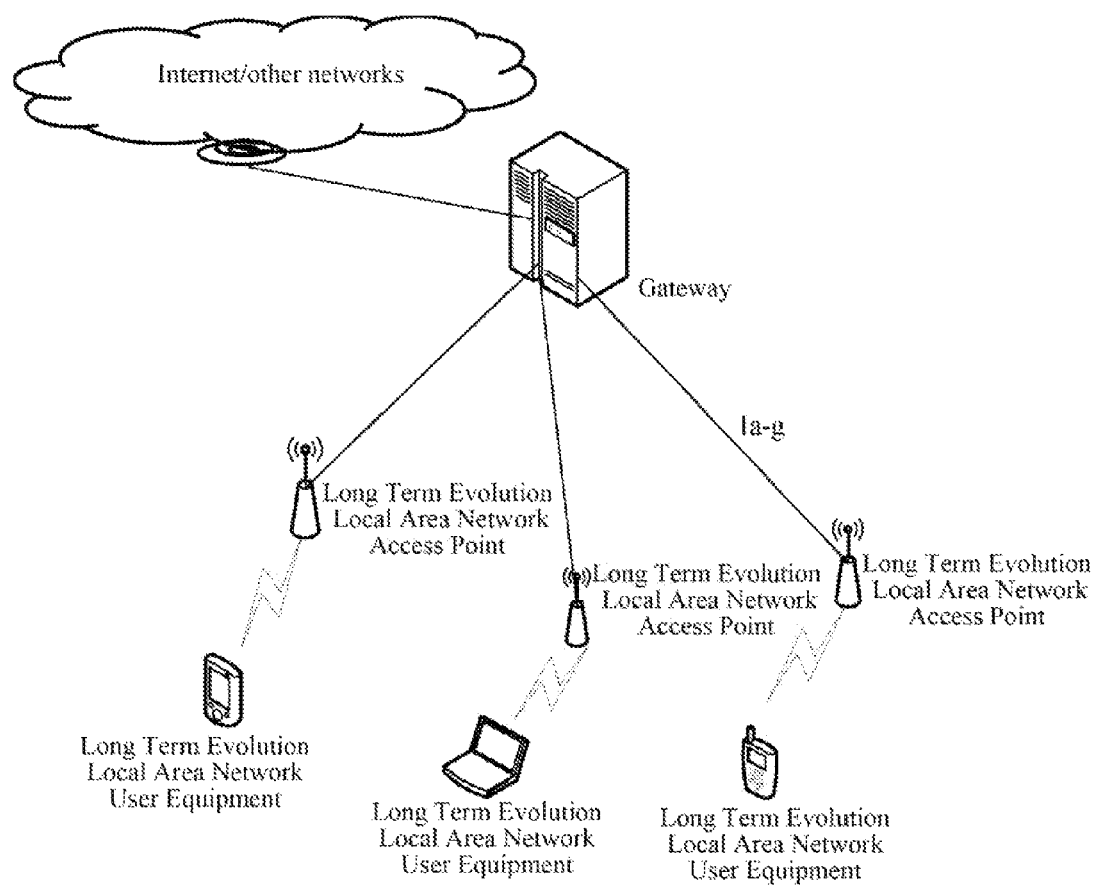
FIG. 1 is a schematic diagram of an LTE-LAN architecture according to an embodiment of the invention.

For the second implementation of QoS control in the process of transmitting uplink service data, an embodiment of the invention provides a radio network access system, which, as illustrated in FIG. 1, includes at least one Access Point, AP, at least one User Equipment, UE, and a gateway, GW, wherein:

The UE is configured to determine a QoS level of an uplink service data packet of a Media Access Control, MAC, layer according to QoS attribute information of an IP layer of the uplink service data packet and to report a scheduling request carrying the QoS level to the AP; and The AP is configured to receive the scheduling request reported by the UE and to schedule radio resources according to the QoS level of the uplink service data packet of the MAC layer in the scheduling request.

The embodiments of the invention provide a novel radio access network and also provide a novel QoS mechanism adapted to the novel radio access network in view of the existing issues of indoor and hotspot area coverage. In the novel QoS mechanism according to the embodiments of the invention, for downlink service data, an AP or a GW determines a QoS level of a downlink service data packet of an MAC layer according to QoS attribute information of the downlink service data packet at an IP layer, and then the AP schedules radio resource transmission according to the QoS level; and for uplink service data, a determines a QoS level of an uplink service data packet of the MAC layer according to QoS attribute information of the uplink service data packet at the IP layer and reports the QoS level and other QoS parameters to the AP in the manner of a scheduling request, and the AP schedules radio resource transmission according to the QoS level, so that the UE transmits the uplink service data packet to the AP. The embodiments of the invention can implement a perfect QoS control mechanism in the foregoing novel radio access network, and this mechanism can be implemented simply at a lower cost as compared with the QoS control mechanism of the LTE because no participation of a core network device and a PCC related protocol entity is required.

Moreover the novel, radio access network according to the embodiments of the invention can be implemented simply with existing LTE underlying communication technologies in view of the characteristics of existing indoor and hotspot data services, to thereby provide a UE with a telecommunication-level QoS-guaranteed service, and QoS related operations will not need participation of a core network node, to thereby greatly alleviate signaling load of the core network and avoid the problems of failing to provide a UE with a QoS-guaranteed service in the existing solution based on the wireless local area network (WLAN) in an unlicensed frequency band and of high implementation complexity and heavy signaling load of the core network in the existing solution based on the home eNB.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

The invention claimed is:

1. A scheduling method based on Quality of Service, QoS, comprising:

scheduling, by the AP, radio resource transmission based upon the QoS level of the downlink service data packet of the MAC layer, wherein determining the QoS level of the downlink service data packet of the MAC layer according to the QoS attribute information of the IP layer in the received downlink service data packet specifically comprises:

determining the QoS level of the downlink service data packet of the MAC layer according to the QoS attribute information in an IP header of the received downlink service data packet and a preset mapping relationship between QoS attribute information and QoS levels, and configuring the determined QoS level in the downlink service data packet of the MAC layer, wherein in the mapping relationship between the QoS attribute information and the QoS levels, the QoS attribute information is represented by different combinations of values of D, T and R bits in a type of service field in the IP header, wherein the D (bit 3), T (bit 4), and R (bit 5) are in the type of service field in the IP header; and the QoS attribute information corresponding to the QoS levels in a descending order is QoS attribute information of control signaling in a same gateway, QoS attribute information of control signaling between gateways, QoS attribute information of a 1-level streaming service, QoS attribute information of a video service, QoS attribute information of a 2-level streaming service, QoS attribute information of a high-level background service, QoS attribute information of a best-effort transmission service and QoS attribute information of a low-level background service respectively.

2. The method according to claim 1, wherein scheduling the radio resource transmission based upon the QoS level of the downlink service data packet of the MAC layer specifically comprises:

scheduling, by the AP, at the MAC layer, resources for a UE receiving the downlink service data packet in a preset scheduling strategy according to the QoS level of the downlink service data packet of the MAC layer, and transmitting the downlink service data packet processed by a physical layer.

3. The method according to claim 2, wherein scheduling, by the AP, the resources for the UE receiving the downlink service data packet in the preset scheduling strategy according to the QoS level specifically comprises:

selecting, by the AP, respective downlink service data packets at a current QoS level from a downlink buffer of the AP in the descending order of QoS levels, and determining respective UEs receiving the selected downlink service data packets; and scheduling resources for the respective determined UEs in accordance with predefined resource allocation priority and maximum null interface transmission delay requirements corresponding to the current QoS level according to channel quality feedback information of the respective UEs receiving the downlink service data packets.

4. The method according to claim 3, wherein in a predefined correspondence relationship between QoS levels and corresponding resource allocation priority and maximum null interface transmission delay requirements, the higher a QoS level is, the higher corresponding resource allocation priority is.

5. The method according to claim 2, wherein scheduling, by the AP selecting, by the AP, respective downlink service data packets at a current QoS level from a downlink buffer of the AP in the descending order of QoS levels of downlink service data packets, and determining respective UEs receiving the selected downlink service data packets; and scheduling resources for the respective determined UEs in accordance with predefined resource allocation priority and maximum null interface transmission delay requirements corresponding to the current QoS level of the downlink service data packet sequentially according to channel quality feedback information of the UEs in the descending order of the numbers of downlink service data packets at the current QoS level received by the respective UEs.

6. A scheduling method based on Quality of Service, QoS, comprising:

transmitting, by the UE, the uplink service data packet processed by a physical layer of the UE to the AP by using resources scheduled by the AP according to the scheduling request, wherein determining, by the UE, the QoS level of the uplink service data packet of the MAC layer according to the QoS attribute information of the IP layer of the uplink service data packet comprises:

determining, by the UE, at the IP layer, the QoS level of the uplink service data packet of the MAC layer according to the QoS attribute information of the uplink service data packet and a preset mapping relationship between QoS attribute information and QoS levels, and configuring the determined QoS level in the uplink service data packet of the MAC layer, and wherein in the mapping relationship between the QoS attribute information and the QoS levels, the QoS attribute information is represented by different combinations of values of D, T and R bits in a type of service field in the IP header, wherein the D (bit 3), T (bit 4), and R (bit 5) are in the type of service field in the IP header; and the QoS attribute information corresponding to the QoS levels in a descending order is QoS attribute information of control signaling in a same gateway, QoS attribute information of control signaling between gateways, QoS attribute information of a 1-level streaming service, QoS attribute information of a video service, QoS attribute information of a 2-level streaming service, QoS attribute information of a high-level background service, QoS attribute information of a best-effort transmission service and QoS attribute information of a low-level background service respectively.

7. The method according to claim 6, wherein the scheduling request is generated as follows:

determining, by the UE, respectively a total number of uplink service data packets to be transmitted, QoS levels of respective uplink service data packets and ratios of numbers of uplink service data packets at respective QoS levels to the total number of uplink service data packets to be transmitted; and generating, by the UE, the scheduling request by carrying a determined total number of uplink service data packets to be transmitted, QoS levels of respective uplink service data packets and ratios of the numbers of uplink service data packets at respective QoS levels to the total number of uplink service data packets to be transmitted in the scheduling request.

8. An Access Point, AP, device, comprising:

the Media Access Control, MAC, layer configured to schedule radio resource transmission based upon the QoS level of the downlink service data packet of the MAC layer, wherein determining the QoS level of the downlink service data packet of the MAC layer according to the QoS attribute information of the IP layer in the received downlink service data packet specifically comprises:

determining the QoS level of the downlink service data packet of the MAC layer according to the QoS attribute information in an IP header of the received downlink service data packet and a preset mapping relationship between QoS attribute information and QoS levels, and configuring the determined QoS level in the downlink service data packet of the MAC layer, wherein in the mapping relationship between the QoS attribute information and the QoS levels, the QoS attribute information is represented by different combinations of values of D, T and R bits in a type of service field in the IP header, wherein the D (bit 3), T (bit 4), and R (bit 5) are in the type of service field in the IP header; and the QoS attribute information corresponding to the QoS levels in a descending order is QoS attribute information of control signaling in a same gateway, QoS attribute information of control signaling between gateways, QoS attribute information of a 1-level streaming service, QoS attribute information of a video service, QoS attribute information of a 2-level streaming service, QoS attribute information of a high-level background service, QoS attribute information of a best-effort transmission service and QoS attribute information of a low-level background service respectively.

9. The device according to claim 8, wherein the MAC layer is further configured to select respective downlink service data packets at a current QoS level from a downlink buffer of the AP device in the descending order of QoS levels and to determine respective UEs receiving the selected downlink service data packets; and to schedule resources for the respective determined UEs in accordance with predefined resource allocation priority and maximum null interface transmission delay requirements corresponding to the current QoS level according to channel quality feedback information of the respective UEs receiving the downlink service data packets.

10. The device according to claim 8, wherein the MAC layer is further configured to select respective downlink service data packets at a current QoS level from a downlink buffer of the AP device in the descending order of QoS levels of downlink service data packets and to determine respective UEs receiving the selected downlink service data packets; and to schedule resources for the respective determined UEs in accordance with predefined resource allocation priority and maximum null interface transmission delay requirements corresponding to the current QoS level of the downlink service data packet sequentially according to channel quality feedback information of the UEs in the descending order of the numbers of downlink service data packets at the current QoS level received by the respective UEs.

11. A gateway, GW, comprising:

an Internet Protocol, IP, layer configured to determine a Quality of Service, QoS, level of a downlink service data packet of a Media Access Control, MAC, layer according to QoS attribute information of the IP layer in the received downlink service data packet and to send the downlink service data packet of the MAC layer carrying the QoS level to an Access Point, AP, wherein determining the QoS level of the downlink service data packet of the MAC layer according to the QoS attribute information of the IP layer in the received downlink service data packet specifically comprises:

determining the QoS level of the downlink service data packet of the MAC layer according to the QoS attribute information in an IP header of the received downlink service data packet and a preset mapping relationship between QoS attribute information and QoS levels, and configuring the determined QoS level in the downlink service data packet of the MAC layer, wherein in the mapping relationship between the QoS attribute information and the QoS levels, the QoS attribute information is represented by different combinations of values of D, T and R bits in a type of service field in the IP header, wherein the D (bit 3), T (bit 4), and R (bit 5) are in the type of service field in the IP header; and the QoS attribute information corresponding to the QoS levels in a descending order is QoS attribute information of control signaling in a same gateway, QoS attribute information of control signaling between gateways, QoS attribute information of a 1-level streaming service, QoS attribute information of a video service, QoS attribute information of a 2-level streaming service, QoS attribute information of a high-level background service, QoS attribute information of a best-effort transmission service and QoS attribute information of a low-level background service respectively.

* * * * *